United States Patent
Yokoyama et al.

(10) Patent No.: US 6,501,710 B2
(45) Date of Patent: Dec. 31, 2002

(54) ACTUATOR FOR OPTICAL PICKUP

(75) Inventors: Kazuhito Yokoyama, Kawasaki (JP); Yasukiyo Kunimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/846,543

(22) Filed: May 1, 2001

(65) Prior Publication Data

US 2002/0021631 A1 Feb. 21, 2002

Related U.S. Application Data

(63) Continuation of application No. PCT/JP98/05168, filed on Nov. 17, 1998.

(51) Int. Cl.[7] ................................................. G11B 7/00
(52) U.S. Cl. ................................. 369/44.14; 369/44.16
(58) Field of Search ........................ 369/44.12, 44.14, 369/44.16, 44.15

(56) References Cited

U.S. PATENT DOCUMENTS

| | | | | |
|---|---|---|---|---|
| 4,912,693 A | * | 3/1990 | Goda | 369/44.14 |
| 5,056,891 A | * | 10/1991 | Masunaga | 369/44.14 |
| 5,410,523 A | * | 4/1995 | Koike et al. | 369/44.14 |
| 5,442,606 A | * | 8/1995 | Mccaslin et al. | 369/44.14 |
| 5,511,049 A | * | 4/1996 | Goda | 369/44.14 |
| 5,524,004 A | * | 6/1996 | Van Rosmalen | 369/44.14 |
| 5,555,228 A | * | 9/1996 | Izuka | 369/44.14 |
| 5,581,533 A | * | 12/1996 | Fujisawa | 369/44.14 |
| 5,598,397 A | * | 1/1997 | Sim | 369/44.15 |
| 5,815,483 A | * | 9/1998 | Iizuka | 369/44.15 |
| 6,111,827 A | * | 8/2000 | Miike | 369/44.15 |

FOREIGN PATENT DOCUMENTS

| | | |
|---|---|---|
| JP | 01088927 A | 4/1989 |
| JP | 1088927 A | 4/1989 |
| JP | 02195522 A | 8/1990 |
| JP | 2195522 A | 8/1990 |
| JP | 4195825 A | 7/1992 |
| JP | 04195825 A | 7/1992 |
| JP | 6-187651 | 7/1994 |
| JP | 06-187651 | 7/1994 |
| JP | 7-210878 | 8/1995 |
| JP | 07-210878 | 8/1995 |
| JP | 09-082079 | 3/1997 |
| JP | 9-082079 | 3/1997 |
| JP | 10-021568 | 1/1998 |

* cited by examiner

Primary Examiner—Nabil Hindi
(74) Attorney, Agent, or Firm—Greer, Burns & Crain, LTD

(57) ABSTRACT

Disclosed herein is an optical storage device having an objective lens actuator for moving an objective lens in a focusing direction. The objective lens actuator includes an actuator base fixed to a carriage movable in the radial direction of an optical disk, a lens holder for holding the objective lens, and a supporting mechanism for elastically supporting the lens holder to the actuator base. The actuator base has an elongated hole extending in the radial direction of the optical disk. A relative position between the actuator base and the carriage is adjusted so that the tilt of the optical axis of the objective lens in the radial direction of the optical disk occurring in displacing the lens holder in the focusing direction is minimized, and thereafter the actuator base is fixed to the carriage by means of screws.

13 Claims, 7 Drawing Sheets

ACTUATOR FOR OPTICAL PICKUP

This is a continuation of International PCT Application No. PCT/JP98/05168, filed Nov. 17, 1998, which was not published in English.

BACKGROUND OF THE INVENTION

1. Field of the Invention

The present invention relates generally to an optical storage device, and more particularly to an actuator for an optical pickup in an optical disk drive.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data from/to the optical disk by means of an optical pickup (optical head).

A recent optical disk drive intended to realize size reduction is composed of a fixed optical assembly including a laser diode module, a beam splitter for reflecting and transmitting a laser beam, and a photodetector for receiving reflected light from an optical disk, and a movable optical assembly including a carriage and an objective lens actuator mounted on the carriage and having an objective lens. The carriage is movable in the radial direction of the optical disk along a pair of rails by means of a voice coil motor (VCM). A write-power laser beam emitted from the laser diode of the fixed optical assembly is first collimated by a collimator lens, next transmitted by the beam splitter, next reflected by a beam raising mirror of the movable optical assembly, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the beam splitter, and finally detected by the photodetector, thereby converting the detected optical signal into an electrical signal.

The objective lens actuator includes an actuator base (fixed portion) fixed to the carriage, and a lens holder (movable portion) supported to the actuator base in a cantilever fashion by a plurality of spring wires or leaf springs. The lens holder has an objective lens, a focusing coil, and a plurality of tracking coils. A magnetic circuit opposed to the focusing coil and the tracking coils to configure the VCM is fixed to the actuator base or the carriage. The conventional objective lens actuator is assembled by the following method. First, the actuator base is temporarily fixed to the carriage by means of screws or the like. Secondly, the tilt of the actuator base or the tilt of a spindle motor for mounting the optical disk is adjusted so that the optical axis of the objective lens becomes substantially perpendicular to an ideal recording surface of the optical disk. Finally, the actuator base is fixed to the carriage.

For a proper reading and/or writing operation in an optical disk drive, a beam spot focused on the recording surface of the optical disk by the objective lens must be maintained always in an optimum shape. Accordingly, the laser beam must be directed onto the recording surface of the optical disk substantially perpendicularly thereto. To meet these requirements, the tilt of the actuator base or the tilt of the spindle motor is adjusted so that the optical axis of the objective lens becomes substantially perpendicular to the ideal recording surface of the optical disk in assembling the optical disk drive as described above. Further, the lens holder holding the objective lens undergoes a focusing operation to maintain an optimum beam spot shape during reading and/or writing of data, because there occur surface vibrations due to potential warpage or the like of the optical disk.

FIG. 1 is a graph showing the tilt of the optical axis of the objective lens in the radial direction of the optical disk in the case of displacing the lens holder in the focusing direction in the conventional objective lens actuator. As described above, the method of assembling the conventional objective lens actuator includes the steps of adjusting the tilt of the actuator base or the tilt of the spindle motor and thereafter fixing the actuator base to the carriage by means of screws or the like. As apparent from FIG. 1, the radial tilt of the optical axis of the objective lens (the tilt in the radial direction of the optical disk) increases with an increase in displacement of the lens holder in the focusing direction in the conventional assembling method. Accordingly, although the radial tilt (−0.07°) is adjusted to 0 at the position where the displacement of the lens holder in the focusing direction is 0 (an ideal focal length to the ideal recording surface) by the tilt adjustment of the actuator base or the spindle motor, the radial tilt in relation to the displacement of the lens holder in the focusing direction remains, causing a possibility of adverse effects on a proper operation. The tilt of the optical axis of the objective lens in the radial direction of the optical disk in relation to the displacement of the lens holder in the focusing direction is expected to be due to the fact that there is a difference in rigidity between the horizontally opposite spring wires supporting the lens holder or that the point of action of the actuator in the focusing direction is offset from the center of gravity of the lens holder.

Thus, the conventional objective lens actuator involves the deviation in position between the center of gravity of the lens holder and the point of action of the actuator in performing a focusing operation, or the imbalance such as variations in spring rigidity between the elastic supporting members (e.g., leaf springs or spring wires) supporting the lens holder. As a result, the tilt of the optical axis of the objective lens occurs in association with a change in spatial position of the lens holder in performing a focusing operation. If the tilt of the optical axis of the objective lens increases, there is a possibility that a data reading and/or writing operation may be adversely affected.

SUMMARY OF THE INVENTION

It is therefore an object of the present invention to provide an optical storage device which can minimize the tilt of the optical axis of an objective lens occurring in performing a focusing operation.

In accordance with an aspect of the present invention, there is provided an optical storage device capable of at least reading information recorded on an optical storage medium, comprising an actuator base for movably supporting a movable portion holding an objective lens for focusing a light beam onto the optical storage medium; a fixing portion for fixing the actuator base; and a lens actuator for driving the objective lens to displace the objective lens at least in a focusing direction, the lens actuator comprising a coil provided on one of the movable portion and the fixing portion and a magnetic circuit provided on the other of the movable portion and the fixing portion; the actuator base being fixed to the fixing portion in the condition that a relative position between the coil and the magnetic circuit in a given direction is set so as to minimize the tilt of the optical axis of the objective lens in the given direction occurring in displacing the objective lens in the focusing direction.

The fixing portion comprises a carriage for moving the lens actuator across tracks formed on the optical storage medium. Preferably, one of the actuator base and the carriage has an elongated hole for adjustment of the relative position. The elongated hole extends in the given direction. The other of the actuator base and the carriage has an engaging member movably engaging with the elongated hole. The given direction is a direction across the tracks or a direction substantially along the tracks.

In accordance with another aspect of the present invention, there is provided an optical storage device capable of at least reading information recorded on an optical storage medium, comprising a drive base; a carriage mounted on the drive base so as to be reciprocatable in a first direction; first driving means for moving the carriage; a light source mounted on the drive base; and an objective lens actuator having an objective lens for focusing a light beam output from the light source onto the optical storage medium; the objective lens actuator comprising an actuator base fixed to the carriage; a lens holder for holding the objective lens; supporting means for movably supporting the lens holder to the actuator base; and second driving means for moving the objective lens in a focusing direction, the second driving means comprising a magnetic circuit fixed to the carriage and a coil fixed to the lens holder; wherein one of the actuator base and the carriage has an elongated hole extending in the first direction; a relative position between the actuator base and the carriage in the first direction is adjusted so that the tilt of the optical axis of the objective lens in the first direction occurring in displacing the lens holder in the focusing direction is minimized; and the actuator base is fixed to the carriage by fixing means inserted through the elongated hole.

In accordance with a further aspect of the present invention, there is provided an optical storage device capable of at least reading information recorded on an optical storage medium, comprising a drive base; a carriage mounted on the drive base so as to be reciprocatable in a first direction; first driving means for moving the carriage; a light source mounted on the drive base; and an objective lens actuator having an objective lens for focusing a light beam output from the light source onto the optical storage medium; the objective lens actuator comprising an actuator base fixed to the carriage; a lens holder for holding the objective lens; supporting means for movably supporting the lens holder to the actuator base; and second driving means for moving the objective lens in a focusing direction, the second driving means comprising a magnetic circuit fixed to the carriage and a coil fixed to the lens holder; wherein one of the actuator base and the carriage has an elongated hole extending in a second direction substantially perpendicular to the first direction; a relative position between the actuator base and the carriage in the second direction is adjusted so that the tilt of the optical axis of the objective lens in the second direction occurring in displacing the lens holder in the focusing direction is minimized; and the actuator base is fixed to the carriage by fixing means inserted through the elongated hole.

In accordance with a still further aspect of the present invention, there is provided a method of assembling an optical head including an actuator base for movably supporting a movable portion holding an objective lens for focusing a light beam onto an optical storage medium, a fixing portion for fixing the actuator base, and a lens actuator for driving the objective lens to displace the objective lens at least in a focusing direction, the lens actuator having a coil provided on one of the movable portion and the fixing portion and a magnetic circuit provided on the other of the movable portion and the fixing portion; the method comprising the steps of temporarily fixing the actuator base to the fixing portion; continuously reciprocating the objective lens in the focusing direction; measuring the tilt of the optical axis of the objective lens in a given direction; adjusting a relative position between the coil and the magnetic circuit in the given direction so that the tilt in the given direction is minimized; and finally fixing the actuator base to the fixing portion after the adjusting step.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
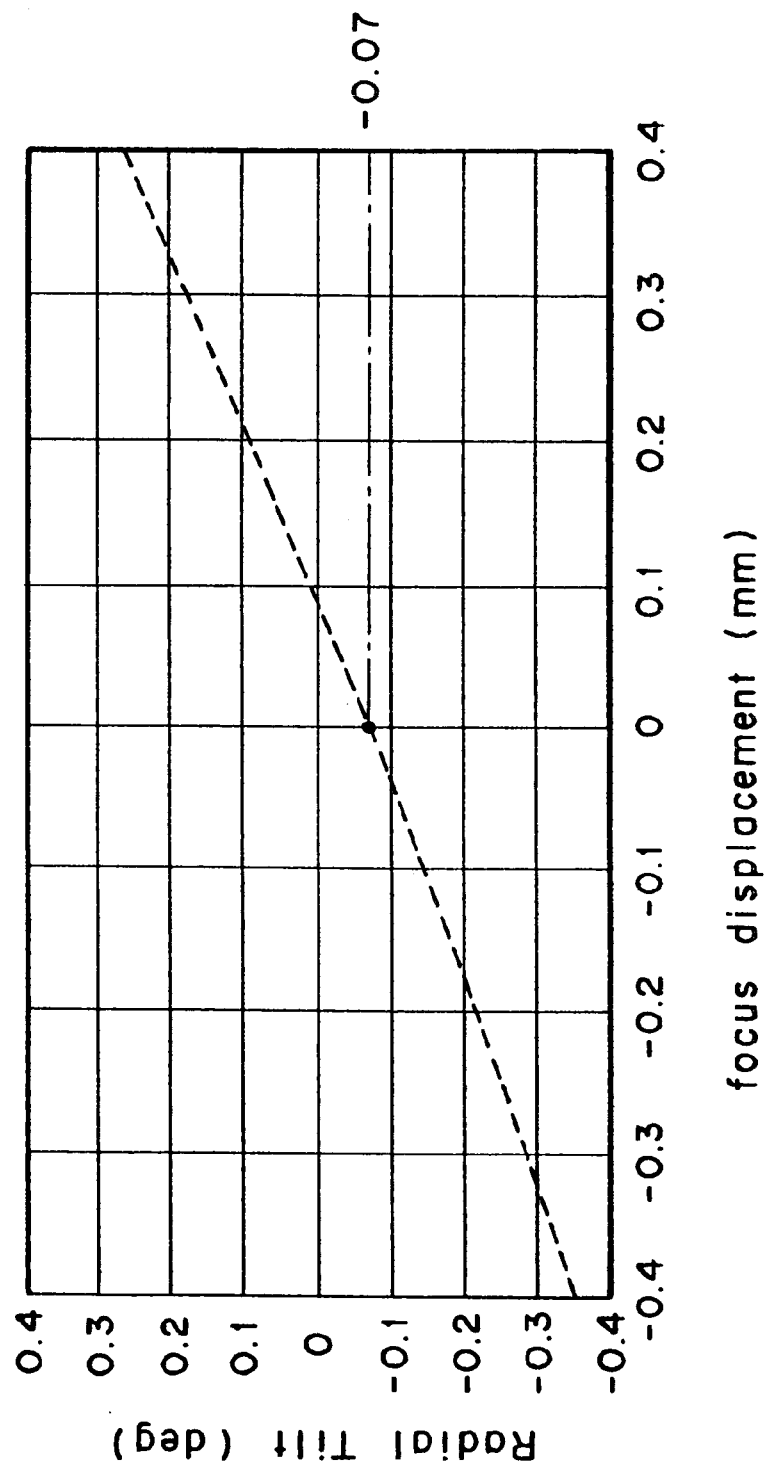
FIG. 1 is a graph showing the tilt of the optical axis of an objective lens in the radial direction of an optical disk in the case of displacing a lens holder in a focusing direction in a conventional optical disk drive.

There will now be described an optical disk drive according to a first preferred embodiment of the present invention with reference to FIGS. 2 to 5. Reference numeral 2 generally denotes a drive base of the optical disk drive. A spindle motor 4 is mounted on the drive base 2. As the configuration of the drive base 2 to which the present invention is applied, the configuration disclosed in U.S. Pat. No. 5,694,314 (Japanese Patent Laid-open No. Hei 9-210878) or Japanese Patent Laid-open No. Hei 9-82079 may be used. When an optical disk 6 is inserted into the optical disk drive, the spindle motor 4 is lifted to chuck the optical disk 6. Reference numeral 8 denotes a carriage movable in the radial direction of the optical disk 6 as being guided by a pair of guide rails 10a and 10b. The carriage 8 is formed of resin.

A pair of magnetic circuits 12a and 12b are mounted on the drive base 2 in parallel to the guide rails 10a and 10b. The magnetic circuits 12a and 12b have the same configuration, so only the magnetic circuit 12a will now be described. The magnetic circuit 12a includes a yoke 16 fixed to the drive base 2, a yoke 18 mounted on the yoke 16, and permanent magnets 20 and 22 respectively fixed to the yokes 16 and 18 by adhesive or the like. A pair of coils 24a and 24b are mounted on the carriage 8. Each of the coils 24a and 24b is inserted in a gap defined between the permanent magnets 20 and 22. A voice coil motor (VCM) is formed by the magnetic circuits 12a and 12b and the coils 24a and 24b. By passing a current through the coils 24a and 24b, the carriage 8 is moved in the radial direction of the optical disk 6 as being guided by the guide rails 10a and 10b.

Figure 3:
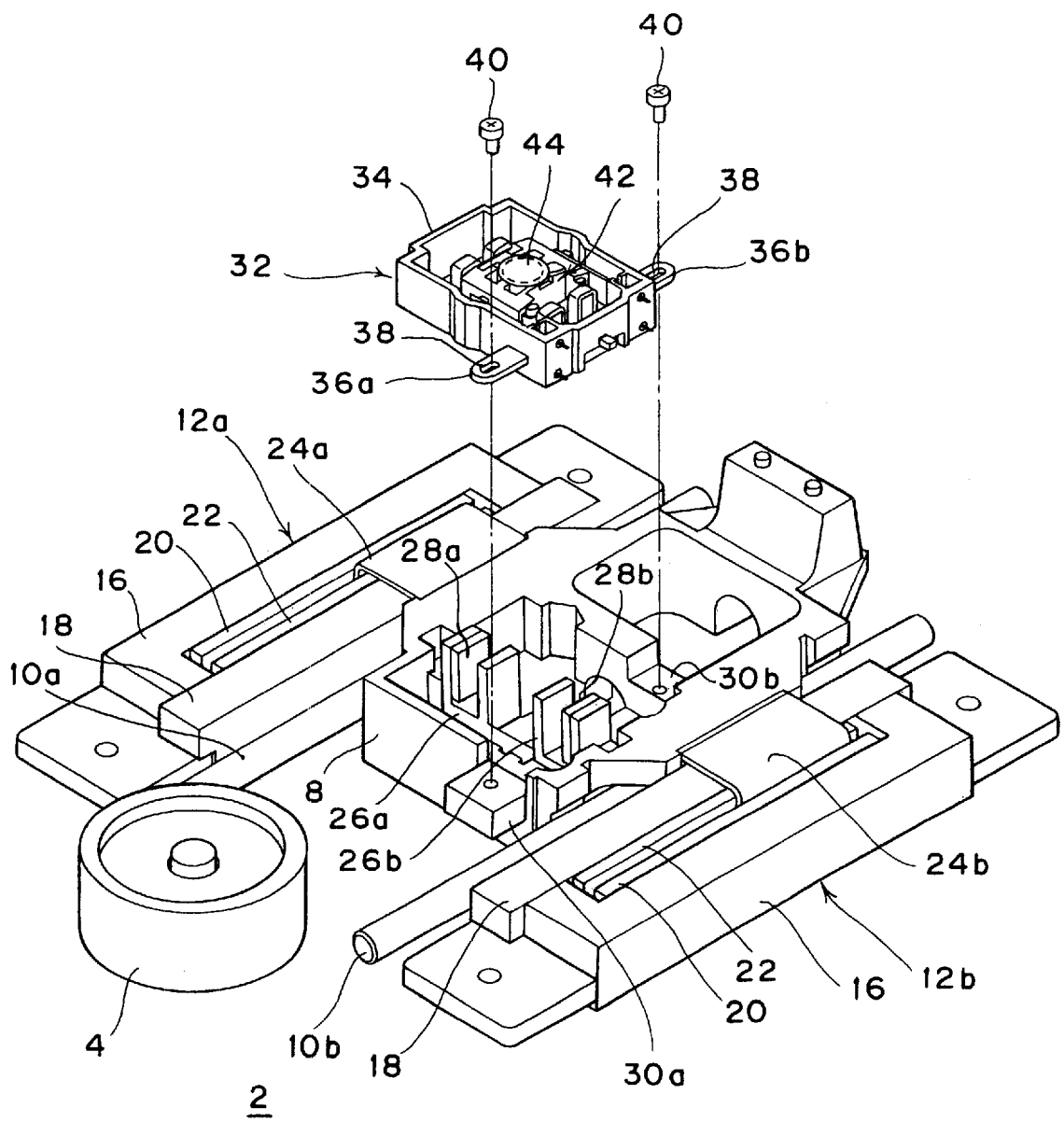
FIG. 3 is an exploded perspective view of the essential part shown in FIG. 2.

As shown in FIG. 3, two U-shaped yokes 26a and 26b are fixed to the carriage 8 by adhesive or the like. Permanent magnets 28a and 28b are fixed to the yokes 26a and 26b by adhesive or the like, respectively. The carriage 8 is formed with a pair of mount seats 30a and 30b each having a tapped hole.

Reference numeral 32 denotes an objective lens actuator. The objective lens actuator 32 includes an actuator base (fixed portion) 34 and a lens holder (movable portion) 42 supported to the actuator base 34 in a cantilever fashion. The actuator base 34 has a pair of brackets 36a and 36b. Each of the brackets 36a and 36b is formed with an elongated hole 38 extending in the direction of movement of the carriage 8. The actuator base 34 and the lens holder 42 are formed of resin. An objective lens 44 is held by the lens holder 42. A beam raising prism 62 is fixed to the carriage 8 (see FIG. 5).

Figure 4:
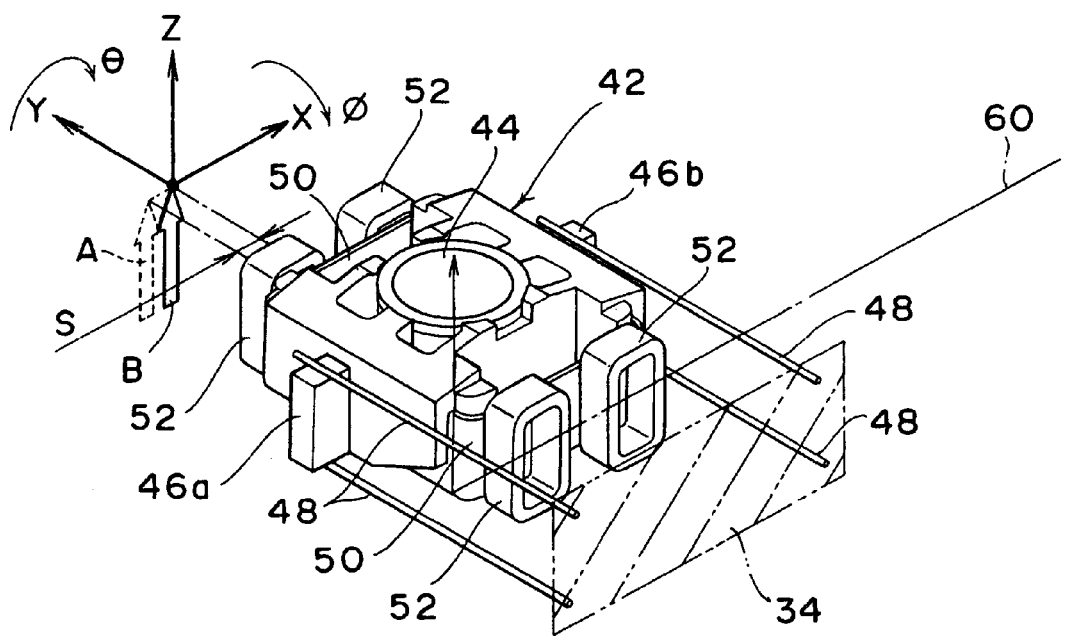
FIG. 4 is a perspective view of a lens holder in the first preferred embodiment.

Referring to FIG. 4, the lens holder 42 is supported to the actuator base 34 in a cantilever fashion by four wires 48 each having elasticity. More specifically, one end of each wire 48 is fixed to the actuator base 34 by adhesive or the like, and the other end of each wire 48 is fixed to a projection 46a or 46b integral with the lens holder 42 by adhesive or the like. In this preferred embodiment, each wire 48 extends in a direction perpendicular to the direction of movement of the carriage 8, i.e., to the radial direction of the optical disk 6. A focusing coil 50 is bonded to the periphery of the lens holder 42. Further, four tracking coils 52 are bonded on the focusing coil 50.

Figure 2:
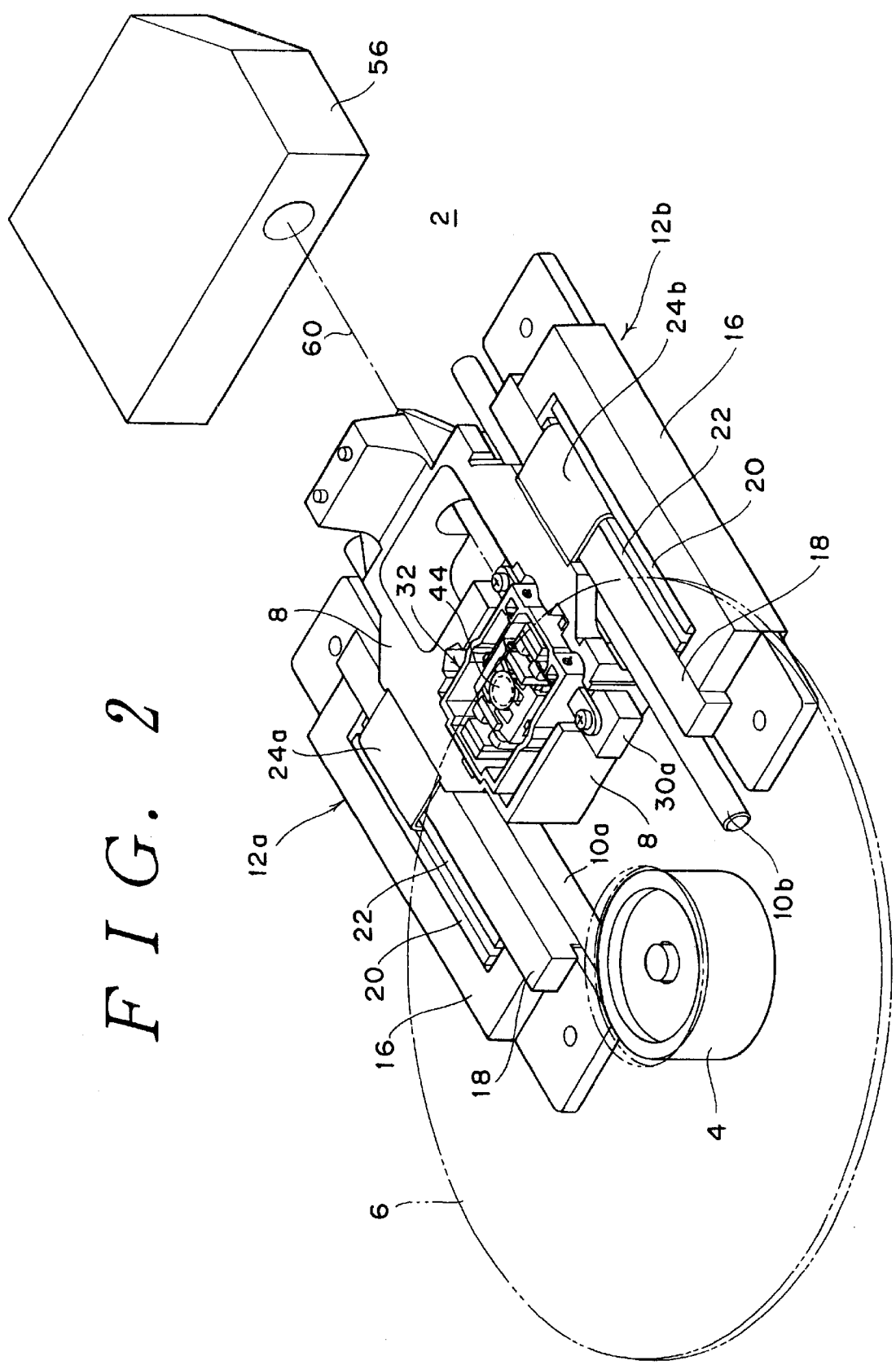
FIG. 2 is a perspective view of an essential part of an optical disk drive according to a first preferred embodiment of the present invention.
Figure 5:
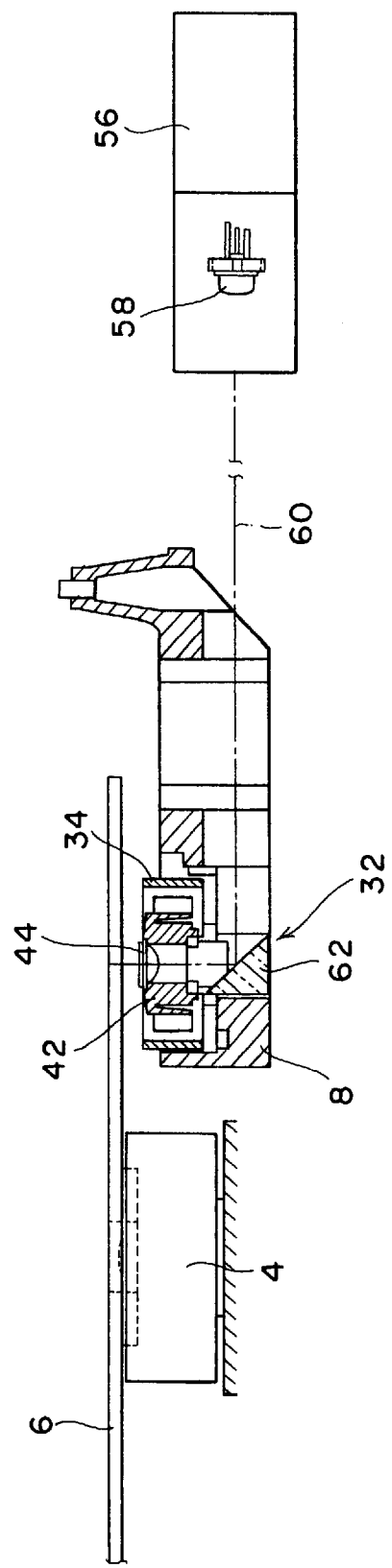
FIG. 5 is a sectional view of the essential part shown in FIG. 2, showing an optical path of a laser beam.

Referring to FIGS. 2 and 5, a fixed optical assembly 56 is mounted on the drive base 2. The fixed optical assembly 56 includes a laser diode 58, a collimator lens (not shown) for collimating a laser beam, a beam splitter (not shown) for reflecting and transmitting the laser beam, and a photodetector (not shown) for receiving reflected light from the optical disk 6. The fixed optical assembly 56 may employ the technique disclosed in Japanese Patent Laid-open No. Hei 9-82079, for example.

Referring to FIG. 3, the objective lens actuator 32 is fixed to the carriage 8 by inserting screws 40 through the elongated holes 38 of the brackets 36a and 36b of the actuator base 34 and threadedly engaging the screws 40 into the tapped holes of the mount seats 30a and 30b of the carriage 8. In fixing the objective lens actuator 32 to the carriage 8, the position of the objective lens actuator 32 in the radial direction of the optical disk 6 relative to the yokes 26a and 26b and magnets 28a and 28b fixed to the carriage 8 can be adjusted, because the elongated holes 38 of the brackets 36a and 36b of the actuator base 34 extend in the radial direction of the optical disk 6. Accordingly, in fixing the objective lens actuator 32, the relative position of the objective lens actuator 32 is adjusted so that almost no radial tilt occurs regardless of displacement of the lens holder 42 in its focusing direction, and thereafter the objective lens actuator 32 is fixed to the carriage 8. That is, the relative position of the focusing coil 50 to the magnetic circuit composed of the yokes 26a and 26b and the magnets 28a and 28b is adjusted, and thereafter the objective lens actuator 32 is fixed to the carriage 8. It is sufficient that the angle of radial tilt be in the range of ±0.2 deg.

In fixing the objective lens actuator 32 to the carriage 8 by threadedly engaging the screws 40 into the tapped holes, instantaneous adhesive is preferably applied to a fixing portion between the objective lens actuator 32 and the carriage 8 in this preferred embodiment. Alternatively, the objective lens actuator 32 may be fixed to the carriage 8 by spontaneous adhesive only without using the screws 40. The above position adjustment of the objective lens actuator 32 is carried out plural times usually by trial and error.

Normally, the lens holder 42 is designed so that the center of gravity of the lens holder 42 substantially coincides in position with a point of action in driving the lens holder 42 in the focusing direction. However, when the objective lens actuator 32 is simply fixed to the carriage 8, the center of gravity of the lens holder 42 does not coincide in position with the point of action in many cases. If there is such noncoincidence in position between the center of gravity of the lens holder 42 and the point of action in performing the focusing operation or there are variations in spring rigidity between the wires 48 for supporting the lens holder 42, the radial tilt of the optical axis of the objective lens 44 occurs in association with a change in spatial position of the lens holder 42 in performing the focusing operation as shown in FIG. 1 related to the prior art.

Referring to FIG. 4, the arrow A depicts the point of action deviated in the radial direction of the optical disk in performing the focusing operation, and the arrow B depicts the ideal point of action in performing the focusing operation. In actual, the point of action is present not at the position shown in FIG. 4, but near the center of gravity of the lens holder 42. The position of the point of action shown in FIG. 4 is a position shown for convenience of illustration. Accordingly, the position adjustment of the lens holder 42 is performed by moving the lens holder 42 in the radial direction of the optical disk so that the point of action comes into coincidence with the ideal point of action depicted by the arrow B. Reference character S denotes the amount of deviation between the ideal point of action and the deviated point of action. Further, reference symbol θ denotes a direction of radial tilt of the optical axis of the objective lens, and reference symbol φ denotes a direction of tangential tilt of the laser beam.

Figure 6:
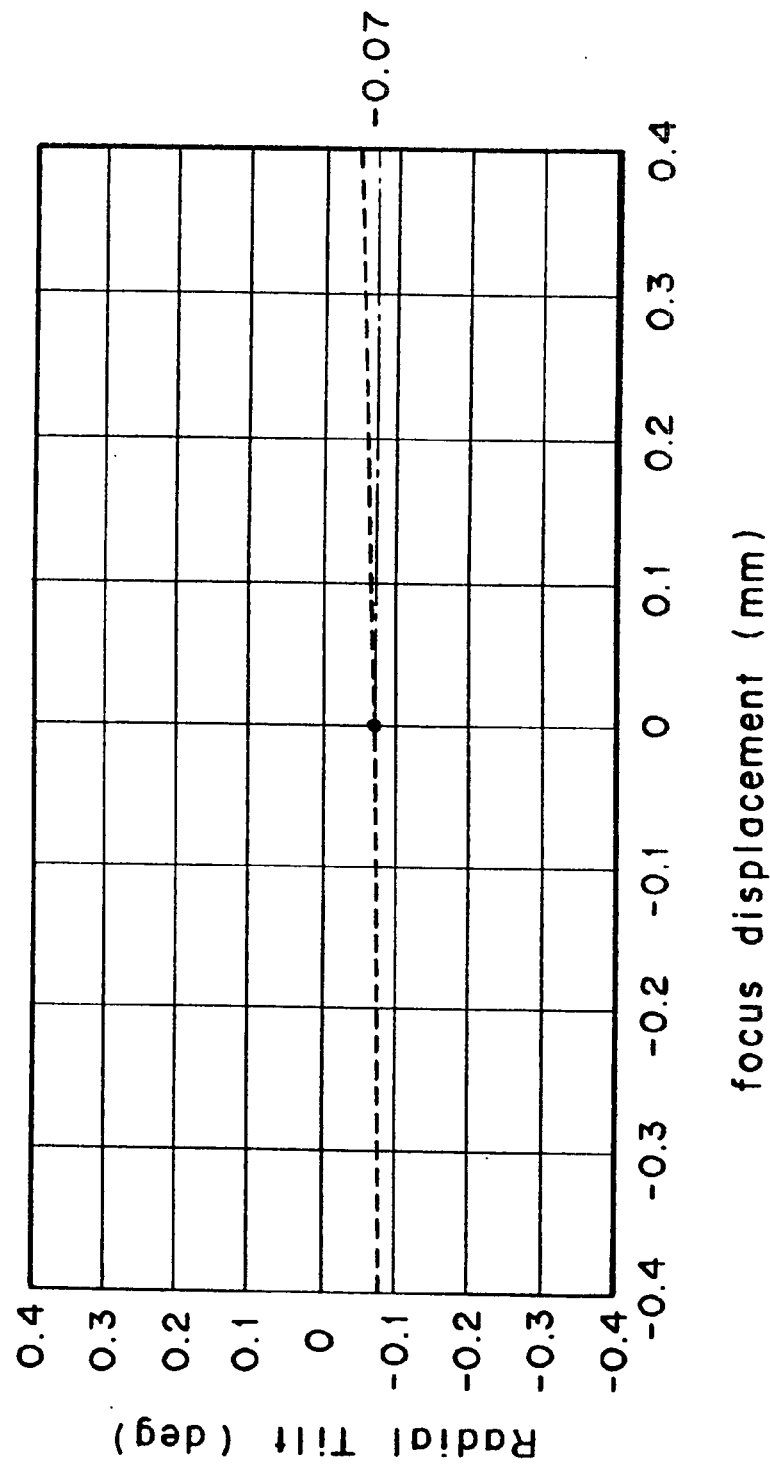
FIG. 6 is a graph showing the tilt of the optical axis of an objective lens in the radial direction of an optical disk in the case of displacing the lens holder in the focusing direction in the first preferred embodiment.

FIG. 6 is a graph showing the radial tilt of the optical axis of the objective lens in relation to focus displacement in the case that the relative position of the lens holder 42 in the radial direction of the optical disk is adjusted according to this preferred embodiment. As apparent from FIG. 6, the radial tilt of the optical axis of the objective lens hardly occurs regardless of the displacement of the lens holder 42 in the focusing direction by the position adjustment of the actuator base 34. That is, in fixing the actuator base 34 to the carriage 8, the actuator base 34 is adjusted in position so that the radial tilt of the optical axis of the objective lens hardly occurs regardless of the displacement of the lens holder 42 in the focusing direction. After this position adjustment, the spindle motor 4 or the actuator base 34 is adjusted in tilt. Accordingly, the radial tilt of the optical axis of the objective lens during the focusing operation of the lens holder 42 can be almost eliminated. As a result, the reliability of data reading and/or writing by the optical pickup using this objective lens actuator 32 can be improved.

The tilt adjustment of the spindle motor 4 and the tilt adjustment of the actuator base 34 mentioned above will now be described in detail. In the case of performing the tilt adjustment of the spindle motor 4, the spindle motor 4 is configured so that its tilt both in the radial direction of the optical disk 6 and in the circumferential direction of the optical disk 6 can be adjusted. The tilt of the spindle motor 4 is adjusted so that a recording surface of a reference disk chucked to the spindle motor 4 becomes perpendicular to the optical axis of the objective lens 44 mounted on the objective lens actuator 32. Thereafter, the spindle motor 4 is fixed to the drive base 2.

The tilt adjustment of the spindle motor 4 is performed by monitoring a reflected beam from the reference disk and a reflected beam from a reference surface of the objective lens 44 (a surface perpendicular to the optical axis of the objective lens) with an autocollimator and tilting the spindle motor 4 so that the beam axes of these reflected beams come into coincidence with each other. The lens holder 42 is so configured as to maintain an ideal distance to the recording surface of the reference disk.

In the case of performing the tilt adjustment of the actuator base 34, the objective lens actuator 32 and the carriage 8 are configured so that the tilt of the actuator base 34 both in the radial direction of the optical disk 6 and in the circumferential direction of the optical disk 6 can be adjusted during assembly of the objective lens actuator 32 and the carriage 8. The tilt of the actuator base 34 is adjusted so that the recording surface of the reference disk chucked to the spindle motor 4 becomes perpendicular to the optical axis of the objective lens 44 mounted on the objective lens actuator 32. Thereafter, the actuator base 34 is fixed to the carriage 8 by adhesive or the like.

The tilt adjustment of the actuator base 34 is performed by monitoring a reflected beam from the reference disk and a reflected beam from the reference surface of the objective lens 44 with an autocollimator and tilting the actuator base 34 so that the beam axes of these reflected beams come into coincidence with each other. The lens holder 42 is so configured as to maintain an ideal distance to the recording surface of the reference disk.

Before or after performing the tilt adjustment of the spindle motor 4 or the tilt adjustment of the actuator base 34, the lens holder 42 is continuously reciprocated in the focusing direction by energizing the focusing coil 50, and the position of the objective lens actuator 32 in the radial direction of the optical disk relative to the carriage 8 is adjusted so that the tilt of the optical axis of the objective lens 44 becomes zero or falls in a certain range.

In recording data, a write-power laser beam output from the laser diode 58 mounted in the fixed optical assembly 56 is transmitted through the collimator lens and the beam splitter (both not shown) to travel along an optical path 60. The laser beam is then reflected by the beam raising prism 62 fixed to the carriage 8 to enter the objective lens 44. The incident laser beam is focused onto the optical disk 6 by the objective lens 44 to thereby write data on the optical disk 6. On the other hand, data reading is performed by directing a read-power laser beam onto the optical disk 6. Reflected light from the optical disk 6 is first collimated by the objective lens 44 and next reflected by the beam raising prism 62 to backward travel along the optical path 60. The return beam is then reflected by the beam splitter (not shown) in the fixed optical assembly 56, and finally detected by the photodetector (not shown) in the fixed optical assembly 56, thereby converting the detected optical signal into an electrical signal.

As a modification of this preferred embodiment, the actuator base 34 may be formed with two pins projecting in a line perpendicular to the direction of extension of the wires 48, and the carriage 8 may be formed with two elongated holes arranged in a line parallel to the radial direction of the optical disk and engaged with the two pins of the actuator base 34, thereby allowing the position adjustment of the actuator base 34 in the radial direction of the optical disk. After this position adjustment, the actuator base 34 is fixed to the carriage 8 by threadedly engaging screws into tapped holes formed on the carriage 8, or by adhesive or the like. As another modification, the actuator base 34 may be formed with two pins projecting in a line perpendicular to the direction of extension of the wires 48, and the carriage 8 may be formed with two vertical surfaces lying on a line parallel to the radial direction of the optical disk and coming into contact with the two pins of the actuator base 34, thereby allowing the position adjustment of the actuator base 34 in the radial direction of the optical disk.

Figure 7:
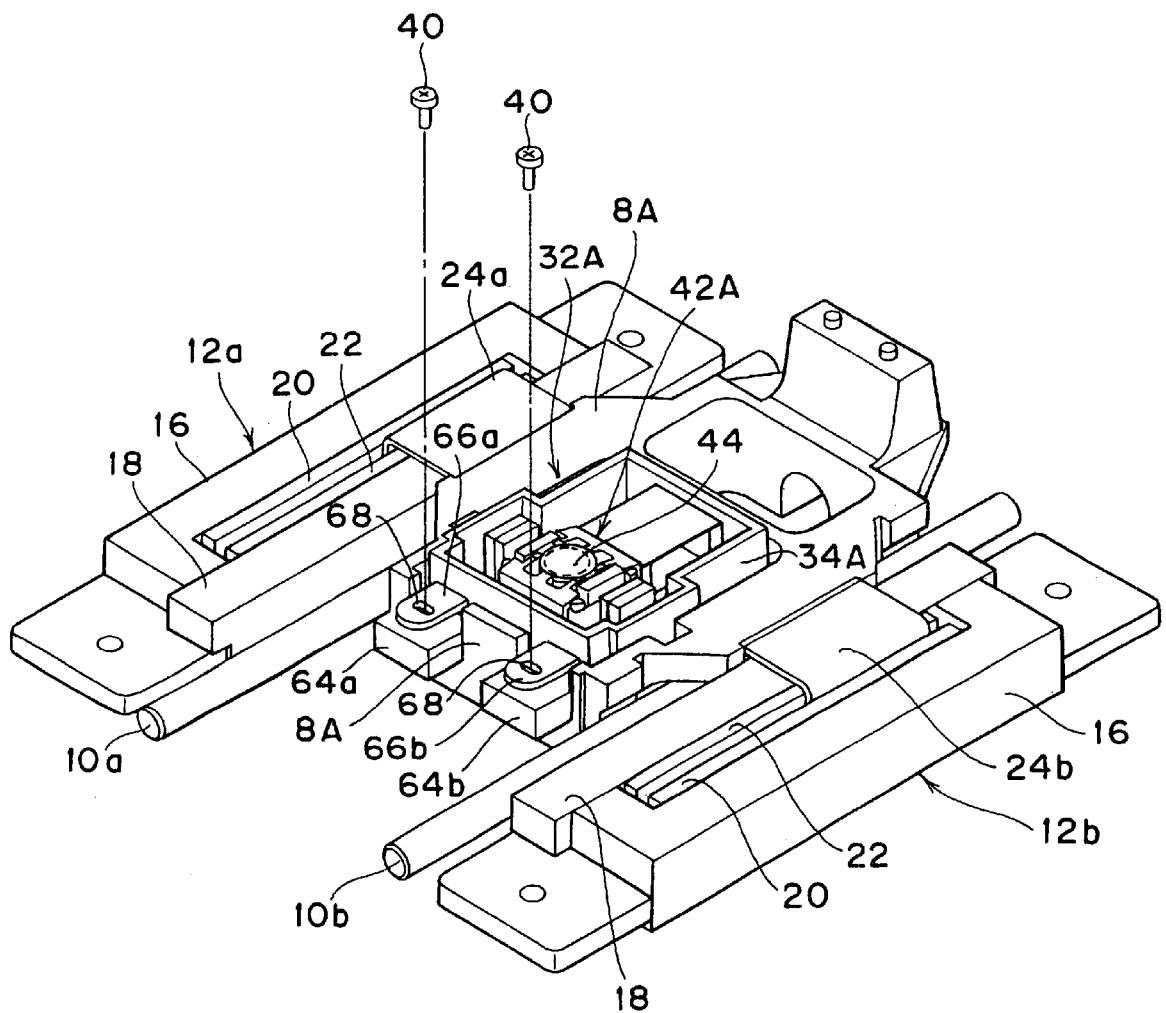
FIG. 7 is a perspective view of an essential part of an optical disk drive according to a second preferred embodiment of the present invention.

FIG. 7 is a perspective view of an essential part of an optical disk drive according to a second preferred embodiment of the present invention. Substantially the same parts as those of the first preferred embodiment are denoted by the same reference numerals. The second preferred embodiment is different from the first preferred embodiment in the mounting direction of a lens holder 42A to a carriage 8A. The carriage 8A has a pair of mount seats 64a and 64b each formed with a tapped hole. An actuator base 34A has a pair of brackets 66a and 66b each formed with an elongated hole 68. Each elongated hole 68 extends in a direction perpendicular to the direction of movement of the carriage 8A. That is, the direction of extension of each elongated hole 68 is a tangential direction of the optical disk 6.

An objective lens actuator 32A is fixed to the carriage 8A by inserting screws 40 through the elongated holes 68 of the brackets 66a and 66b of the actuator base 34A and threadedly engaging the screws 40 into the tapped holes of the mount seats 64a and 64b of the carriage 8A. The lens holder 42A is supported to the actuator base 34A in a cantilever fashion by means of two leaf springs extending in the moving direction of the carriage 8A. In the case that the direction of extension of each leaf spring supporting the lens holder 42A is the same as the radial direction of the optical disk as described above, there occurs tangential tilt of the optical axis of the objective lens 44 in the tangential direction of the optical disk due to a change in spatial position of the lens holder 42A in the focusing operation.

To cope with this, the actuator base 34A is adjusted in position in the tangential direction of the optical disk prior to fixation to the carriage 8A so that the tangential tilt of the optical axis of the objective lens 44 hardly occurs regardless of the displacement of the lens holder 42A in the focusing direction. After this position adjustment, the actuator base 34A is fixed to the carriage 8A by the screws 40. It is sufficient that the tangential tilt be in the range of ±0.2 deg. Thereafter, the tilt adjustment of the spindle motor 4 or the tilt adjustment of the actuator base 34A is performed. Accordingly, the tangential tilt of the optical axis of the objective lens 44 can be minimized even during the focusing operation of the lens holder 42A. Also in the second preferred embodiment, modifications similar to those of the first preferred embodiment as mentioned above may be made.

While the coils 50 and 52 are provided on the lens holder for the purpose of weight reduction in each preferred embodiment mentioned above, magnetic circuits each consisting of a permanent magnet and a yoke may be mounted on the lens holder. In this case, the coils are fixed to the carriage. Further, while the magnetic circuit consisting of the permanent magnet 28a and the yoke 26a and the magnetic circuit consisting of the permanent magnet 28b and the yoke 26b are mounted on the carriage in each preferred embodiment mentioned above, these magnetic circuits may be mounted on the actuator base.

According to the present invention as described above, the relative position between the actuator base and the carriage in the radial direction or tangential direction of the optical disk is adjusted in assembling the objective lens actuator. Accordingly, the noncoincidence in position between the center of gravity of the lens holder and the point of action and/or the imbalance in spring rigidity between the pair of elastic members for supporting the lens holder can be corrected to thereby minimize the tilt of the optical axis of the objective lens due to a change in spatial position of the lens holder in performing the focusing operation. As a result, an optimum beam spot shape can be maintained in reading and/or writing data, thereby reducing read/write error to improve the reliability of the optical disk drive or optical storage device. Further, a beam spot size can be controlled to become smaller, thereby allowing higher-density recording. Further, the relative position between the coil and the magnetic circuit for driving the objective lens can be precisely controlled to thereby suppress deviations of the optical axis of the objective lens occurring in driving the objective lens.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical storage device capable of at least reading information recorded on an optical storage medium, comprising:
   an actuator base for movably supporting a movable portion holding an objective lens for focusing a light beam onto said optical storage medium;
   a fixing portion for fixing said actuator base;
   a lens actuator for driving said objective lens to displace said objective lens at least in a focusing direction, said lens actuator including a coil provided on one of said movable portion and said fixing portion and a magnetic circuit provided on the other of said movable portion and said fixing portion; and
   said actuator base being fixed to said fixing portion in the condition that a relative position between said coil and said magnetic circuit in a given direction is set so as to minimize the tilt of the optical axis of said objective lens in said given direction occurring in displacing said objective lens in said focusing direction.

2. An optical storage device according to claim 1, wherein said fixing portion comprises a carriage for moving said lens actuator across tracks formed on said optical storage medium.

3. An optical storage device according to claim 2, wherein one of said actuator base and said carriage has an elongated hole for adjustment of said relative position, said elongated hole extending in said given direction.

4. An optical storage device according to claim 3, wherein the other of said actuator base and said carriage has an engaging member movably engaging with said elongated hole.

5. An optical storage device according to claim 1, wherein said given direction is a direction across tracks formed on said optical storage medium.

6. An optical storage device according to claim 1, wherein said given direction is a direction substantially along tracks formed on said optical storage medium.

7. A method of assembling an optical head including an actuator base for movably supporting a movable portion holding an objective lens for focusing a light beam onto an optical storage medium, a fixing portion for fixing said actuator base, and a lens actuator for driving said objective lens to displace said objective lens at least in a focusing direction, said lens actuator having a coil provided on one of said movable portion and said fixing portion and a magnetic circuit provided on the other of said movable portion and said fixing portion; said method comprising the steps of:
   temporarily fixing said actuator base to said fixing portion;
   continuously reciprocating said objective lens in said focusing direction;
   measuring the tilt of the optical axis of said objective lens in a given direction;
   adjusting a relative position between said coil and said magnetic circuit in said given direction so that the tilt in said given direction is minimized; and
   finally fixing said actuator base to said fixing portion after said adjusting step.

8. A method according to claim 7, wherein said fixing portion comprises a carriage for moving said lens actuator across tracks formed on said optical storage medium.

9. A method according to claim 8, wherein:
   one of said actuator base and said carriage has an elongated hole for adjustment of said relative position, said elongated hole extending in said given direction;
   the other of said actuator base and said carriage has an engaging member movably engaging with said elongated hole; and
   said relative position is adjusted by moving said engaging member within said elongated hole.

10. A method according to claim 7, wherein said given direction is a direction across tracks formed on said optical storage medium.

11. A method according to claim 7, wherein said given direction is a direction substantially along tracks formed on said optical storage medium.

12. An optical storage device capable of at least reading information recorded on an optical storage medium, comprising:
   a drive base;
   a carriage mounted on said drive base so as to be reciprocatable in a first direction;
   first driving means for moving said carriage;
   a light source mounted on said drive base; and
   an objective lens actuator having an objective lens for focusing a light beam output from said light source onto said optical storage medium;
   said objective lens actuator comprising:
      an actuator base fixed to said carriage;
      a lens holder for holding said objective lens;
      supporting means for movably supporting said lens holder to said actuator base; and
      second driving means for moving said objective lens in a focusing direction, said second driving means including a magnetic circuit fixed to said carriage and a coil fixed to said lens holder;
      wherein one of said actuator base and said carriage has an elongated hole extending in said first direction;
      a relative position between said coil and said magnetic circuit in said first direction is adjusted so that the tilt of the optical axis of said objective lens in said first direction occurring in displacing said lens holder in said focusing direction is minimized; and
      said actuator base is fixed to said carriage by fixing means inserted through said elongated hole.

13. An optical storage device capable of at least reading information recorded on an optical storage medium, comprising:

a drive base;

a carriage mounted on said drive base so as to be reciprocatable in a first direction;

first driving means for moving said carriage;

a light source mounted on said drive base; and an objective lens actuator having an objective lens for focusing a light beam output from said light source onto said optical storage medium;

said objective lens actuator comprising:
an actuator base fixed to said carriage;
a lens holder for holding said objective lens;
supporting means for movably supporting said lens holder to said actuator base; and
second driving means for moving said objective lens in a focusing direction, said second driving means comprising a magnetic circuit fixed to said carriage and a coil fixed to said lens holder;

wherein one of said actuator base and said carriage has an elongated hole extending in a second direction substantially perpendicular to said first direction;

a relative position between said coil and said magnetic circuit in said second direction is adjusted so that the tilt of the optical axis of said objective lens in said second direction occurring in displacing said lens holder in said focusing direction is minimized; and said actuator base is fixed to said carriage by fixing means inserted through said elongated hole.

* * * * *